United States Patent
Offen et al.

(10) Patent No.: US 9,081,687 B2
(45) Date of Patent: Jul. 14, 2015

(54) METHOD AND APPARATUS FOR MONITOR AND MWAIT IN A DISTRIBUTED CACHE ARCHITECTURE

(75) Inventors: Zeev Offen, Haifa (IL); Alon Naveh, Ramat Hasharon (IL); Iris Sorani, Nahariya (IL)

(73) Assignee: Intel Corporation, Santa Clara, CA (US)

( * ) Notice: Subject to any disclaimer, the term of this patent is extended or adjusted under 35 U.S.C. 154(b) by 1144 days.

(21) Appl. No.: 11/966,806

(22) Filed: Dec. 28, 2007

(65) Prior Publication Data

US 2009/0172284 A1 Jul. 2, 2009

(51) Int. Cl.
G06F 12/08 (2006.01)
G06F 9/30 (2006.01)

(52) U.S. Cl.
CPC ............ *G06F 12/084* (2013.01); *G06F 9/3009* (2013.01); *G06F 2201/885* (2013.01)

(58) Field of Classification Search
CPC ................ G06F 9/30–9/3897; G06F 8/458; G06F 9/3834; G06F 2201/86; G06F 2201/885
USPC .............. 710/15–19; 711/141, 144–154, 156, 711/163
See application file for complete search history.

(56) References Cited

U.S. PATENT DOCUMENTS

| | | | |
|---|---|---|---|
| 5,594,886 A * | 1/1997 | Smith et al. | 711/136 |
| 6,185,634 B1 * | 2/2001 | Wilcox | 710/26 |
| 6,675,192 B2 * | 1/2004 | Emer et al. | 718/107 |
| 2003/0126379 A1 * | 7/2003 | Kaushik et al. | 711/150 |
| 2006/0143333 A1 * | 6/2006 | Minturn et al. | 710/52 |
| 2006/0149885 A1 * | 7/2006 | Sistla et al. | 710/310 |
| 2006/0294326 A1 * | 12/2006 | Jacobson et al. | 711/156 |
| 2007/0088916 A1 * | 4/2007 | Jacobson et al. | 711/141 |
| 2007/0150658 A1 * | 6/2007 | Moses et al. | 711/130 |

* cited by examiner

*Primary Examiner* — Aimee Li
*Assistant Examiner* — Nicholas Simonetti
(74) *Attorney, Agent, or Firm* — Trop, Pruner & Hu, P.C.

(57) ABSTRACT

A method and apparatus for monitor and mwait in a distributed cache architecture is disclosed. One embodiment includes an execution thread sending a MONITOR request for an address to a portion of a distributed cache that stores the data corresponding to that address. At the distributed cache portion the MONITOR request and an associated speculative state is recorded locally for the execution thread. The execution thread then issues an MWAIT instruction for the address. At the distributed cache portion the MWAIT and an associated wait-to-trigger state are recorded for the execution thread. When a write request matching the address is received at the distributed cache portion, a monitor-wake event is then sent to the execution thread and the associated monitor state at the distributed cache portion for that execution thread can be reset to idle.

17 Claims, 3 Drawing Sheets

US 9,081,687 B2

METHOD AND APPARATUS FOR MONITOR AND MWAIT IN A DISTRIBUTED CACHE ARCHITECTURE

FIELD OF THE DISCLOSURE

This disclosure relates generally to the field of microprocessors. In particular, the disclosure relates to efficiently implementing MONITOR and MWAIT instructions in a distributed cache architecture.

BACKGROUND OF THE DISCLOSURE

Modern high-performance microprocessors can have a number of execution cores and multiple levels of cache storage. Thus there is an ever increasing demand for higher interconnect bandwidth between these components. One technique to provide such higher interconnect bandwidths involves distributed cache partitioning with parallel access to multiple portions of the distributed cache through a shared interconnect.

Another aspect of some modern high-performance microprocessors includes multithreaded software and hardware, and thread synchronization through shared memory. An example of two instructions to provide thread synchronization through shared memory would be the MONITOR and the MWAIT instructions of Intel Corporation's SSE3 instruction set. MONITOR defines an address range used to monitor write-back stores. MWAIT is used to indicate that an execution thread is waiting for data to be written to the address range defined by the MONITOR instruction. The thread can then transition into a low power state and wait to be notified by a monitor-wake event when data is written to the monitored address range.

When the two above mentioned techniques are used in combination with each other, additional challenges present themselves. For example, centralized tracking of all monitor requests for all of the active execution threads while permitting parallel access to multiple portions of the distributed cache may introduce bottlenecks and adversely impact the performance of distributed cache access through the shared interconnect. To date, efficient techniques for implementing thread synchronization through MONITOR and MWAIT instructions in a distributed cache architecture have not been fully explored.

BRIEF DESCRIPTION OF THE DRAWINGS

The present invention is illustrated by way of example and not limitation in the figures of the accompanying drawings.

DETAILED DESCRIPTION

Methods and apparatus for MONITOR and MWAIT in a distributed cache architecture are herein disclosed. One embodiment includes an execution thread sending a MONITOR request for an address via a communication interconnect to a portion of a distributed cache that stores data corresponding to that address. At the distributed cache portion the MONITOR request and an associated speculative state is recorded locally for that execution thread. The execution thread then issues an MWAIT instruction for the address. At the distributed cache portion the MWAIT and an associated wait-to-trigger state are then recorded for the execution thread. When a write request matching the address is received at the distributed cache portion, a monitor-wake event is then sent to the execution thread. The associated monitor state at the distributed cache portion for that execution thread may then be reset or cleared to idle.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

It will be appreciated that address ranges may be divided in a distributed cache system according to a variety of algorithms. A single central MONITOR tracking agent could be inefficient and become a performance bottleneck. On the other hand, a distributed tracking mechanism may present a potential for false monitor-wake events, stale addresses being monitored, and other potential performance issues. For example, when an execution thread sends a sequence of MONITOR requests, the most recent MONITOR request could be directed to a different distributed cache portion than some previous requests, which presents a potential for stale addresses being monitored and false monitor-wake events. Requiring, in such a distributed tracking system, that old MONITOR requests be cleared by the execution thread before issuing new requests could potentially slow processing and introduce new race conditions.

A three-state machine as will be described in detail below with regard to FIG. 3, solves the issues raised above, at least in part, by introducing a speculative state. It ensures that monitor-wake events are sent only for the last monitored address, while still tracking addresses from the time the MONITOR request is received, even before receiving an MWAIT request.

Figure 1:
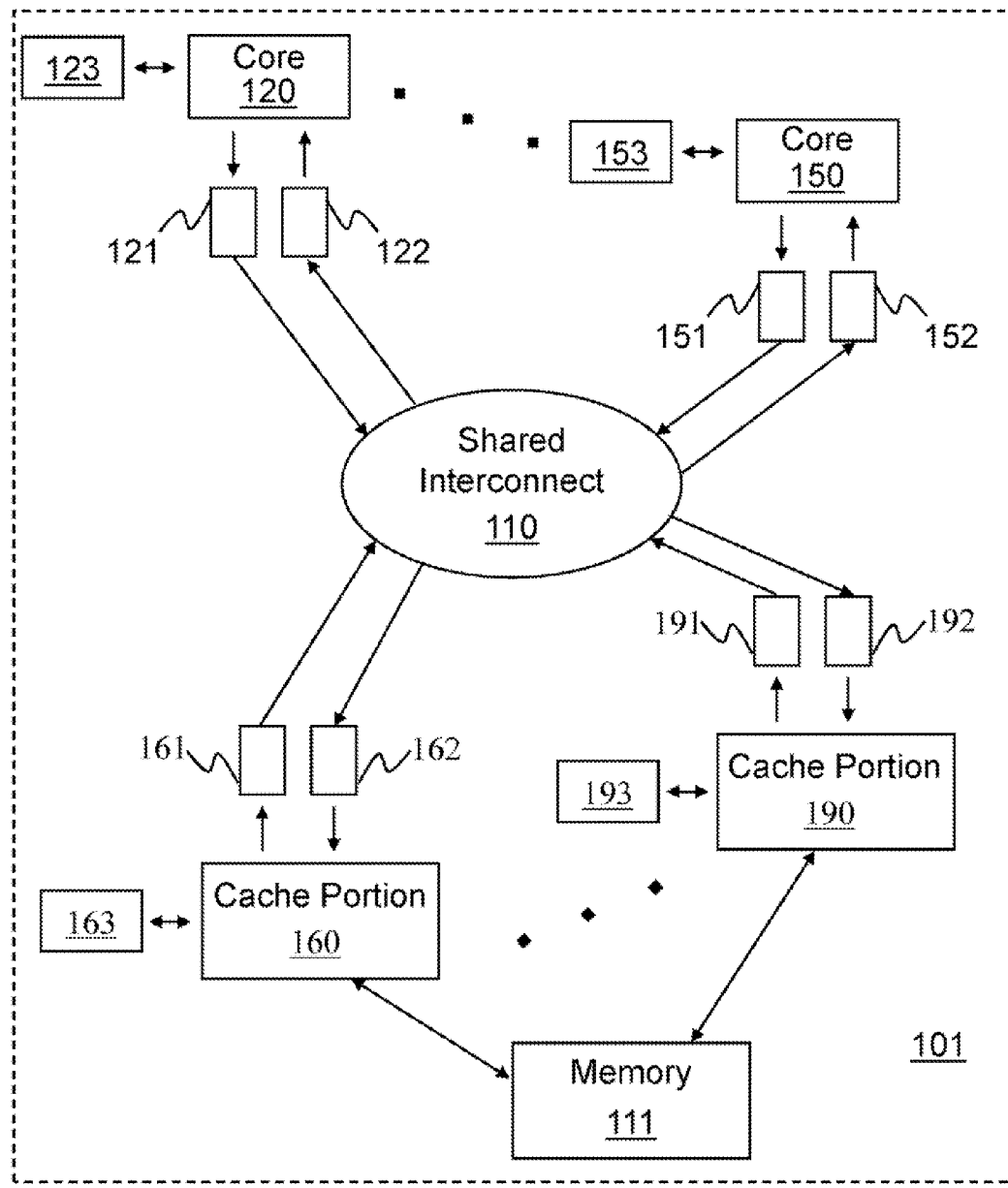
FIG. 1 illustrates one embodiment of a computing system with a distributed cache architecture to perform thread synchronization through MONITOR and MWAIT instructions.

FIG. 1 illustrates one embodiment of a computing system 101 with a distributed cache architecture to perform thread synchronization through MONITOR and MWAIT instructions. Computing system 101 comprises main memory storage 111 and distributed cache portions 160-190 to cache copies of data from main memory storage 111. Distributed cache portions 160-190 may also including local state storage 163-193, respectively, to record MONITOR requests for execution threads and associated states which will be described in greater detail below.

Computing system 101 further comprises a shared interconnect 110 and execution cores 120-150. Execution cores 120-150 and distributed cache portions 160-190 may include communication egress queues 121-151 and 161-191 and communication ingress queues 122-152 and 162-192, respectively, to send and receive requests, data, instructions, acknowledgements and other communications via shared interconnect 110.

One of execution cores 120-150 may send a MONITOR request for an address from a particular execution thread via shared interconnect 110. The MONITOR request will be routed to one of the distributed cache portions 160-190, that one of the distributed cache portions 160-190 being the particular cache portion supposed to store data corresponding to the monitored address. The cache portion receiving the MONITOR request can record the requested address to monitor and record an associated speculative state in local state storage for the requesting execution thread.

Execution cores 120-150 may also include local storage, 123-153, respectively, to store the last monitored addresses for each execution thread. When the execution thread issues an MWAIT instruction, the last monitored addresses for that execution thread may be provided by the execution core to shared interconnect 110 so that the MWAIT request can be routed to the same cache portion supposed to store data corresponding to the monitored address. The cache portion receiving the MWAIT request can then record the MWAIT for the execution thread and an associated wait-to-trigger state in local state storage for the requesting execution thread. That cache portion may also acknowledge the MWAIT by sending an acknowledgement back to the execution thread.

When the cache portion receives a write request matching the monitored address it can send a monitor-wake event to the execution thread at its execution core, at which point it may optionally record an associated idle state in local state storage for the requesting execution thread.

It will be appreciate that many different connection topologies may be suitable for shared interconnect 110, execution cores 120-150 and distributed cache portions 160-190. In one embodiment, a ring topology may be used. In alternative embodiments a mesh, or a crossbar or a hypercube or some hybrid combination of these or other topologies may be used.

In some embodiments of the distributed cache architecture to perform thread synchronization through MONITOR and MWAIT instructions, the last level of caches are partitioned into distributed cache slices to function as described above with regard to distributed cache portions 160-190 and can be accessed in parallel through shared interconnect 110. In some alternative embodiments, the write request may be received at the cache portion in the form of a relayed request from another cache portion or level. For example, the cache portion may receive the write request as a read for ownership request or as a state transition associated with the monitored address, changing from a shared state to an exclusive state. It will be appreciated that these are just alternative forms in which the write request may be received at the cache portion.

Figure 2:
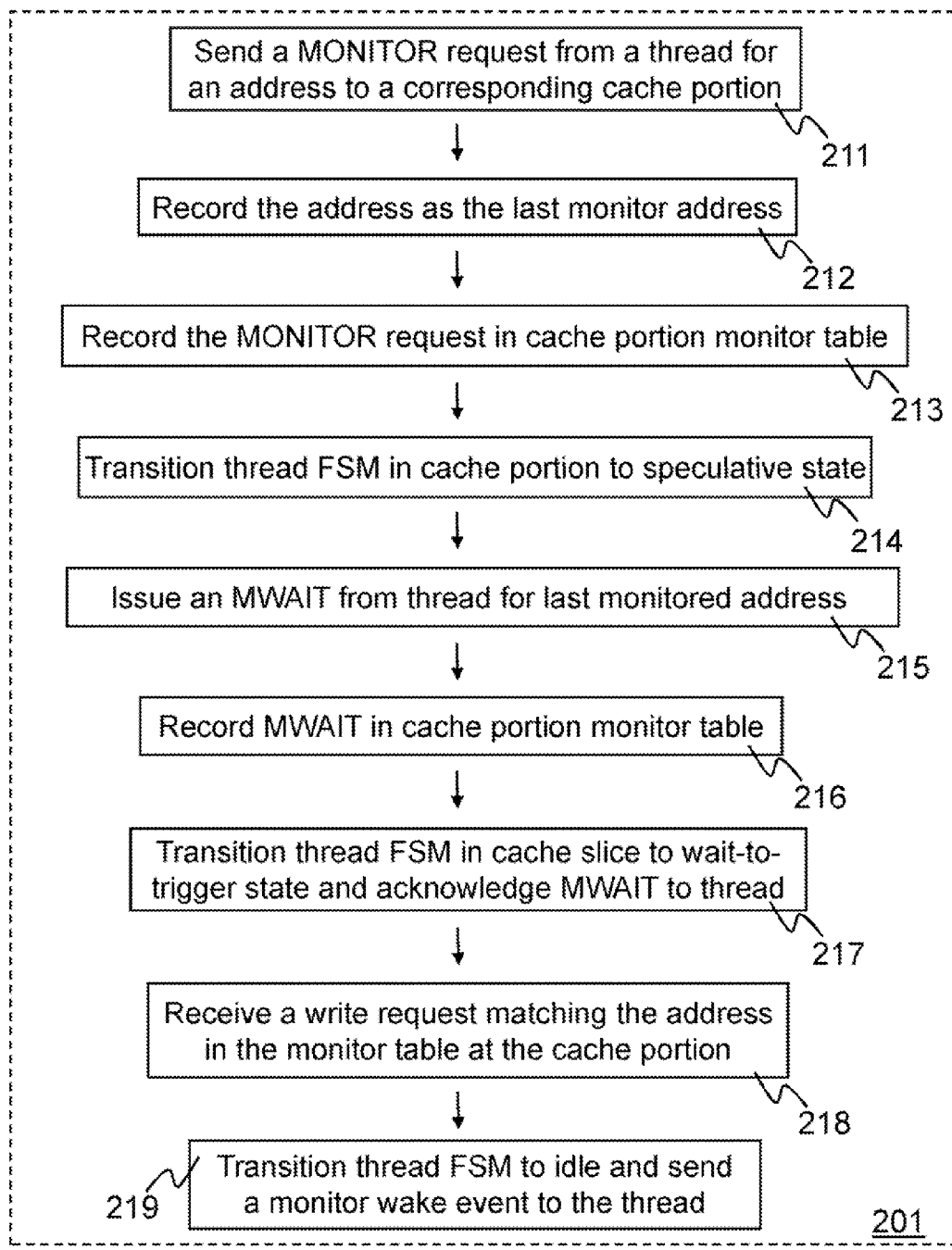
FIG. 2 illustrates a flow diagram for one embodiment of a process to perform thread synchronization through MONITOR and MWAIT instructions in a distributed cache architecture.

FIG. 2 illustrates a flow diagram for one embodiment of a process 201 to perform thread synchronization through MONITOR and MWAIT instructions in a distributed cache architecture. Process 201 and other processes herein disclosed are performed by processing blocks that may comprise dedicated hardware or software or firmware operation codes executable by general purpose machines or by special purpose machines or by a combination of both.

In processing block 211 a MONITOR request for an address is sent from an execution thread out of multiple execution threads to one of the distributed cache portions, that one of the distributed cache portions being the particular cache portion supposed to store data corresponding to the monitored address. In processing block 212 the address may be recorded for that thread as its last monitored address. At the cache portion, in processing block 213 the MONITOR request is recorded for the execution thread. In processing block 214 a speculative state is associated with the cache portion's monitor finite-state machine for that thread. The cache portion may receive a monitor clear request from the execution thread while the monitor finite-state machine is in a speculative state, in which case the recorded MONITOR request for the execution thread may then be erased. Further details of such conditions are discussed below with regard to FIG. 3.

In processing block 215 an MWAIT instruction is issued from the execution thread for the address. At the cache portion, in processing block 216 the MWAIT is recorded for the execution thread. In processing block 217 a wait-to-trigger state is associated with the cache portion's monitor finite-state machine for that thread and an acknowledgement of the MWAIT may also be sent back to the thread.

In processing block 218 a write request is received at the cache portion and it is determined that the write request received matches the monitored address. Finally in processing block 219 a monitor-wake event is sent to the execution thread an idle state is associated with the cache portion's monitor finite-state machine for that thread.

It will be appreciated that multiple embodiments of process 201 may be performed concurrently in a distributed fashion by a distributed cache architecture in any one or more cache portions for any or all of the concurrent execution threads in the system. In any distributed cache system, since addresses and the corresponding data must necessarily be associated with each other, there must exist a system for routing read and write requests to the correct distributed cache portions according to the requested address. That same system may also be used to route MONITOR requests and MWAIT requests.

Figure 3:
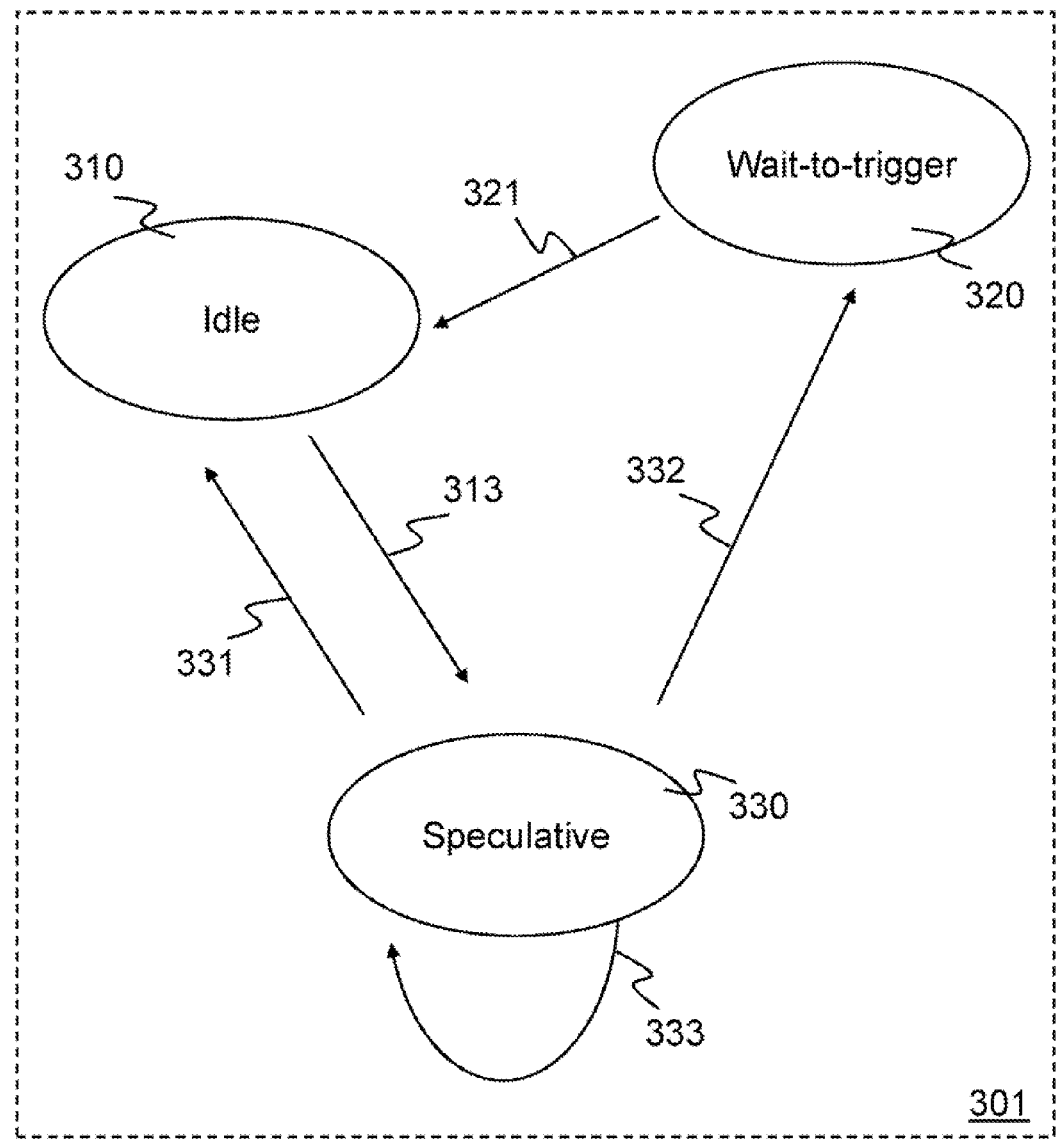
FIG. 3 illustrates a flow diagram for one embodiment of a monitor finite-state machine in a portion of a distributed cache architecture.

FIG. 3 illustrates a flow diagram for one embodiment of a monitor finite-state machine 301 in a portion of a distributed cache architecture. Upon receiving a MONITOR request for an address from an execution thread, monitor finite-state machine 301 in the cache portion that is to store data corresponding to that address makes transition 313 from the idle state 310 to the speculative state 330.

If the cache portion receives a write request matching the address or a monitor clear request from the execution thread while monitor finite-state machine 301 is in speculative state 330, finite-state machine 301 makes transition 331 back to the state 310. If the cache portion receives another MONITOR request from that same execution thread, monitor finite-state machine 301 makes transition 333 returning to speculative state 330 and may also adjust the monitored address as necessary. On the other hand, if the cache portion receives an MWAIT request from that execution thread, monitor finite-state machine 301 makes transition 332 to wait-to-trigger state 320. It will be appreciated that the cache portion may also acknowledge the MWAIT by sending an acknowledgement back to the execution thread.

It will be appreciated that speculative state 330 ensures that monitor-wake events are sent only for the last monitored address, while tracking addresses from the time a MONITOR request is received, even before receiving an MWAIT request.

If the cache portion receives a write request matching the monitored address while monitor finite-state machine 301 is in wait-to-trigger state 320, a monitor-wake event is sent to the execution thread. On the other hand, the cache portion may receive a monitor clear request from the execution thread while monitor finite-state machine 301 is in wait-to-trigger state 320. In such a case the MONITOR request may be erased for that execution thread and no monitor-wake event needs to be sent to the execution thread, but in either of these two cases, monitor finite-state machine 301 may make transition 321 back to the idle state 310.

It will be appreciated that in some embodiments the addresses being monitored and recorded at the cache portion can also be used to prevent the data corresponding to said addresses from being evicted from the cache portion in order to further improve the performance of thread synchronization. In alternative embodiments, the addresses being monitored and the associated speculative states or wait-to-trigger states recorded at the cache portion can be retained and tracked even after data corresponding to said addresses is evicted from the cache portion.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

What is claimed is:

1. A processor comprising:
    a plurality of execution cores, each including a local storage to store a last monitored address for each of a plurality of execution threads when the execution thread is to issue a monitor request; and
    a distributed cache having a plurality of distributed cache portions, each cache portion to store data corresponding to an address of a memory storage location, the cache portion also including state storage to store monitor requests and associated states, and
        wherein responsive to receipt of a monitor request for the address from an execution thread, the cache portion is to store the address and to record in the state storage the monitor request for the execution thread and an associated speculative state for a monitor state machine of the cache portion for the execution thread, and to transition the monitor state machine from an idle state to the speculative state;
        further responsive to receipt of an mwait request from the execution thread for the address prior to issuance of a clear request or a monitor request for a second address, to record in the state storage the mwait request for the execution thread and an associated wait-to-trigger state for the monitor state machine, and to transition the monitor state machine from the speculative state to the wait-to-trigger state, and then to send a monitor-wake event to the execution thread responsive to receipt of a write request that matches the address while the monitor state machine is in the wait-to-trigger state and to record in the state storage the idle state for the monitor state machine; and
        responsive to receipt of the monitor request for the second address from the execution thread while the monitor state machine is in the speculative state, the cache portion is to store the second address and to transition the monitor state machine to be maintained in the speculative state, and responsive to receipt of a write request for the second address while the monitor state machine is in the speculative state and the second address is stored in the cache portion to transition the monitor state machine to the idle state.

2. The processor of claim 1, wherein the address to be monitored and the associated speculative state or wait-to-trigger state are to be recorded at the cache portion even after the data corresponding to said address is evicted from the cache portion.

3. The processor of claim 1, wherein the distributed cache comprises a last level cache.

4. The processor of claim 1, wherein the processor comprises multithreaded hardware.

5. The processor of claim 1, further comprising a shared interconnect to couple the plurality of execution cores.

6. The processor of claim 5, further comprising a plurality of communication egress queues coupled to the shared interconnect.

7. The processor of claim 6, further comprising a plurality of communication ingress queues coupled to the shared interconnect.

8. The processor of claim 1, wherein the address to be monitored and recorded in the state storage is further to be used to prevent the data corresponding to the address from being evicted from the cache portion.

9. The processor of claim 1, wherein the speculative state of the monitor state machine is to ensure that a monitor-wake event is to be sent only for the last monitored address.

10. The processor of claim 1, wherein the speculative state of the monitor state machine is to track addresses from a time of receipt of a monitor request and before receipt of an mwait request.

11. The processor of claim 1, wherein the cache portion is to transition the monitor state machine to the idle state from the wait-to-trigger state responsive to receipt of the clear request.

12. A method comprising:
    responsive to receipt of a monitor request for an address from an execution thread in a cache portion of a distributed cache having a plurality of distributed cache portions, each cache portion to store data corresponding to an address of a memory storage location, the cache portion also including state storage to store monitor requests and associated states, storing the address and recording in the state storage the monitor request for the execution thread and an associated speculative state for a monitor state machine of the cache portion for the execution thread, and transitioning the monitor state machine from an idle state to the speculative state;
    further responsive to receipt of an mwait request from the execution thread for the address prior to issuance of a clear request or a monitor request for a second address, recording in the state storage the mwait request for the execution thread and an associated wait-to-trigger state for the monitor state machine, and transitioning the monitor state machine from the speculative state to the wait-to-trigger state;
    sending a monitor-wake event to the execution thread responsive to receipt of a write request that matches the address while the monitor state machine is in the wait-to-trigger state and recording in the state storage the idle state for the monitor state machine; and
    responsive to receipt of the monitor request for the second address from the execution thread while in the speculative state, storing the second address and transitioning the monitor state machine to be maintained in the speculative state, and responsive to receipt of a write request for the second address while the monitor state machine is in the speculative state and the second address is stored in the cache portion transitioning the monitor state machine to the idle state.

13. The method of claim 12, wherein the speculative state of the monitor state machine is to ensure that a monitor-wake event is to be sent only for a last monitored address.

14. The method of claim 12, further comprising tracking addresses from a time of receipt of a monitor request and before receipt of an mwait request.

15. A system comprising:
    a plurality of execution cores, each including a local storage to store a last monitored address for each of a plurality of execution threads when the execution thread is to issue a monitor request;
    a shared interconnect to couple the plurality of execution cores;

a distributed cache to couple to the shared interconnect and having a plurality of distributed cache portions, each cache portion to store data corresponding to an address of a memory storage location, the cache portion also including state storage to store monitor requests and associated states, and wherein responsive to receipt of a monitor request for the address from an execution thread, the cache portion is to store the address and to record in the state storage the monitor request for the execution thread and an associated speculative state for a monitor state machine of the cache portion for the execution thread, and to transition the monitor state machine from an idle state to the speculative state;

further responsive to receipt of an mwait request from the execution thread for the address prior to issuance of a clear request or a monitor request for a second address, to record in the state storage the mwait request for the execution thread and an associated wait-to-trigger state for the monitor state machine, and to transition the monitor state machine from the speculative state to the wait-to-trigger state, and then to send a monitor-wake event to the execution thread responsive to receipt of a write request that matches the address while the monitor state machine is in the wait-to-trigger state and to record in the state storage the idle state for the monitor state machine; and further responsive to receipt of the monitor request for the second address from the execution thread while the monitor state machine is in the speculative state, the cache portion is to store the second address and transition the monitor state machine to be maintained in the speculative state, and responsive to receipt of a write request for the second address while the monitor state machine is in the speculative state and the second address is stored in the cache portion, to transition the monitor state machine to the idle state; and a system memory coupled to the shared interconnect.

16. The system of claim 15, wherein the address to be monitored and the associated speculative state or wait-to-trigger state are to be recorded at the cache portion even after the data corresponding to said address is evicted from the cache portion.

17. The system of claim 15, wherein the speculative state of the monitor state machine is to ensure that a monitor-wake event is to be sent only for the last monitored address.

* * * * *